United States Patent
Liu et al.

(10) Patent No.: US 11,669,494 B2
(45) Date of Patent: Jun. 6, 2023

(54) SCALING OUT DATA PROTECTION INFRASTRUCTURE

(71) Applicant: EMC IP Holding Company LLC, Hopkinton, MA (US)

(72) Inventors: Cherami Min Liu, Shanghai (CN); Ming Zhang, Shanghai (CN); Jing Yu, Shanghai (CN); Arun Murti, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 223 days.

(21) Appl. No.: 16/881,233

(22) Filed: May 22, 2020

(65) Prior Publication Data

US 2021/0365415 A1    Nov. 25, 2021

(51) Int. Cl.
| | | |
|---|---|---|
| *G06F 7/00* | (2006.01) | |
| *G06F 16/174* | (2019.01) | |
| *G06F 16/2455* | (2019.01) | |
| *G06F 16/21* | (2019.01) | |
| *G06F 16/188* | (2019.01) | |
| *G06F 16/14* | (2019.01) | |
| *G06F 9/455* | (2018.01) | |

(52) U.S. Cl.
CPC ...... *G06F 16/1748* (2019.01); *G06F 9/45558* (2013.01); *G06F 16/14* (2019.01); *G06F 16/188* (2019.01); *G06F 16/217* (2019.01); *G06F 16/24556* (2019.01); *G06F 2009/45562* (2013.01); *G06F 2009/45575* (2013.01); *G06F 2009/45583* (2013.01)

(58) Field of Classification Search
CPC .............. G06F 16/1748; G06F 16/217; G06F 16/24556; G06F 16/14; G06F 9/45558; G96F 16/188
See application file for complete search history.

(56) References Cited

U.S. PATENT DOCUMENTS

| | | | | |
|---|---|---|---|---|
| 8,935,493 | B1 * | 1/2015 | Dolan | G06F 3/0649 711/161 |
| 9,323,655 | B1 * | 4/2016 | Sahin | G06F 3/061 |
| 9,323,682 | B1 * | 4/2016 | Marshak | G06F 12/0866 |
| 9,836,244 | B2 * | 12/2017 | Bates | H04L 63/0457 |

(Continued)

FOREIGN PATENT DOCUMENTS

| | | | |
|---|---|---|---|
| EP | 2449477 | * | 5/2009 |
| EP | 2449477 | * | 5/2012 |
| EP | 2449477 A2 | * | 5/2012 |

*Primary Examiner* — Daniel A Kuddus
(74) *Attorney, Agent, or Firm* — Staniford Tomita LLP (57) ABSTRACT

Embodiments for optimizing data storage instances in a cloud environment in which metadata is stored and accessed separately from content data in multiple different instances of data storage units. A metadata and content data storage instance optimization process determines the status of different instances of virtual storage resources for both metadata and content data. Full instances are powered down when they are not needed, empty instances are deleted, and data of partially full instances is moved to other appropriate instances to create empty instances that can be deleted. The data storage instance optimization process is provided as part of a data protection search process that provides an execution environment and user interface to the optimization process.

18 Claims, 6 Drawing Sheets

(56) References Cited

U.S. PATENT DOCUMENTS

| | | | | |
|---|---|---|---|---|
| 10,055,420 B1* | 8/2018 | Pogde | ................. | G06F 11/1448 |
| 10,108,644 B1* | 10/2018 | Wigmore | .............. | G06F 16/214 |
| 10,152,381 B1* | 12/2018 | Shvaiger | .............. | G06F 3/0631 |
| 10,346,297 B1* | 7/2019 | Wallace | ................ | G06F 3/0608 |
| 10,353,603 B1* | 7/2019 | Baruch | ................ | G06F 3/0619 |
| 10,423,533 B1* | 9/2019 | Viswanathan | ...... | G06F 12/0891 |
| 10,503,427 B2* | 12/2019 | Botes | ................. | G06F 11/2094 |
| 10,671,309 B1* | 6/2020 | Glynn | .................. | G06F 3/0683 |
| 10,671,431 B1* | 6/2020 | Dolan | .................. | G06F 3/0649 |
| 10,817,392 B1* | 10/2020 | McAuliffe | .......... | G06F 11/0727 |
| 10,924,548 B1* | 2/2021 | Karumbunathan | ......................... H04L 61/4552 | |
| 10,992,598 B2* | 4/2021 | Grunwald | ............. | G06F 16/275 |
| 2012/0254174 A1* | 10/2012 | Mitra | ................... | G06F 12/126 707/E17.046 |
| 2018/0260125 A1* | 9/2018 | Botes | ...................... | G06F 3/065 |
| 2019/0171563 A1* | 6/2019 | Wallace | ............... | G06F 3/0652 |
| 2019/0354450 A1* | 11/2019 | Grunwald | ........... | G06F 16/1824 |

* cited by examiner

SCALING OUT DATA PROTECTION INFRASTRUCTURE

TECHNICAL FIELD

This invention relates generally to cloud networks and more specifically to scaling out data protection infrastructure.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data access much more easy and reliable. Cloud networks are widely used for large-scale data backup operations by enterprises that process large amounts of data on a regular basis, such as weekly or daily company-wide backups.

Modern data protection systems provide backup software and storage solutions for powerful data backup, recovery and archiving. Systems, such as Dell EMC data protection solutions provide comprehensive and easy-to-use tools for backup, recovery, data replication, cloud disaster recovery and long-term retention and low cost-to-protect. With such backup systems, customers back up data and protect it from edge to core to cloud while taking advantage of policy-driven automation to simplify data protection tasks. They employ deduplication backup programs to reduce storage overhead, and backup data and applications within the public cloud and manage secure long-term retention of backups to the cloud. The Dell EMC Data Domain (DD) program is a scalable, cloud-enabled backup appliance that protects data with reduced disk storage requirements, while Data Domain Virtual Edition (DDVE) provides flexible capacity that can scale easily, enabling customers to deploy capacity in multiple instances on standard hardware, converged or in the cloud.

In a current known end-to-end data protection system, such as the Dell EMC Avamar system, when used in conjunction with a protection storage system, such as DDVE, metadata can be stored on one storage system under one program (e.g., Avamar Virtual Edition, AVE) while actual content data can be stored in a different storage system under the other program (e.g., DDVE). In such a case, a data protection search function must access data based on both metadata and content data indexes. In a cloud-based environment, the metadata searches and accesses must be properly orchestrated with those of the content data, especially when some of the resources may be available on-premise rather than in the cloud. To provide adequate scaling capacity, multiple storage instances (AVE and DDVE) may be created and configured. In general, cloud instances are charged by usage, and less than full instances would be charged continuously for low value. Likewise, any on-premises instances would use valuable server resources, so non-full or empty data instances would occupy resources continuously for low value. Thus, in a system that uses both AVE and DDVE instances, much computing resources are typically consumed, and the presence of partially full or empty instances represents inefficient usage and potentially great wasted cost. In addition, certain critical resource-intensive tasks, such as garbage collection (GC) may be compromised by the presence of such non-full instances.

What is needed therefore, is a way to orchestrate metadata and data storage instances to reduce data storage costs, optimize storage scale-up processes and normal data protection and deduplication operations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Avamar, DDVE, and AVE are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Embodiments may be implemented in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
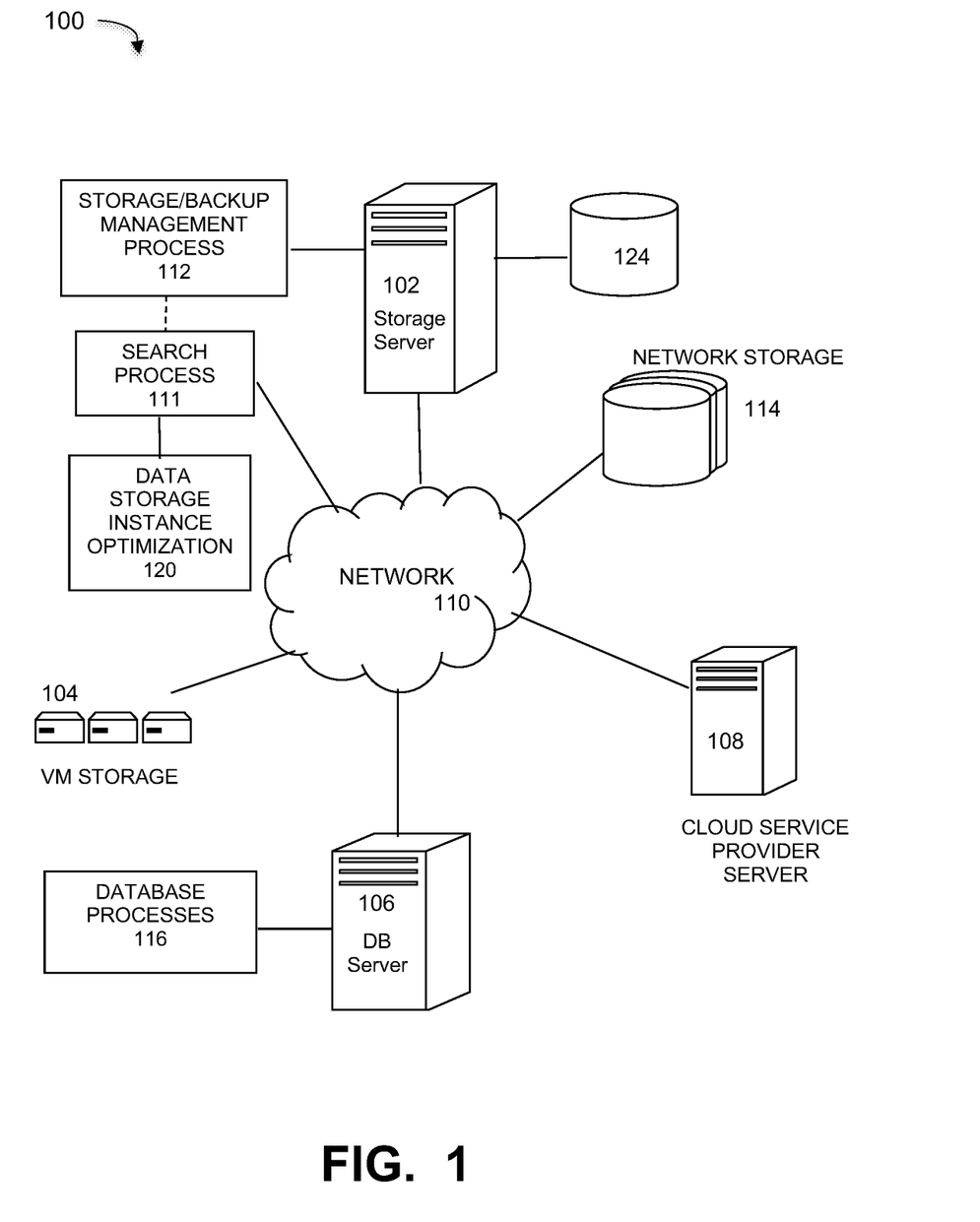
FIG. 1 is a diagram of a cloud computing network implementing a metadata and content data storage instance orchestration process, under some embodiments.

Embodiments are described for orchestrating data storage using cloud resources when accessing data in large-scale deduplication backup systems. FIG. 1 illustrates a computer network system that implements one or more embodiments of a cloud storage network system implementing a data storage optimization (or orchestration) process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. Such resources and resource allocations represent capacity that is available for use by subscribed users. Such users may be represented by individual nodes or groups of nodes in the system managed by one or more individual entities.

Cloud resources are typically presented to users by cloud service providers as certain amounts of storage capacity, network bandwidth, and computing power for certain periods of time, and may be actually be embodied as disparate hardware (e.g., storage media, routers, CPU's, etc.) within an overall cloud network 110. The example cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier may have one or more cloud units that are used for data migration and storage using migration, copying, duplication, long-term retention (LTR), and other processes.

The cloud tier contains certain resources, such as storage media, computing resources, and intra-cluster data transmission bandwidth, among other similar resources. In general, network customers (users) pay for cloud resources based their amount of usage of storage capacity, network bandwidth, processor overhead, and so on, and many resources are energy-intensive, and hence quite expensive. Many costs are fixed due to constant energy usage such that idle or under-utilized resources may still cost significant amounts. For example, under-utilized disk storage devices are constantly running and consuming energy even when they are idle and not full of data.

As stated above, embodiments include data protection environments in which metadata is stored and accessed separately from content data in multiple different instances of data storage units. System 100 includes a metadata and content data storage instance optimization process 120 that determines the status of different instances of virtual storage resources for both metadata and content data. It is configured to power down totally full instances when they are not needed, delete empty instances, and move the data of partially full instances to other instances to create empty instances that can be deleted. For the embodiment of FIG. 1, the data storage instance optimization process 120 is provided as part of a data protection search process 111 that provides an execution environment and user interface to the optimization process. The search program can be cloud-based or it may be on-premises, such as executed in or as part of the backup management process 112. For this embodiment, the storage instances comprises a large-capacity storage cluster accessed by the search function facilitating data access requests by a user through a user interface.

Figure 2:
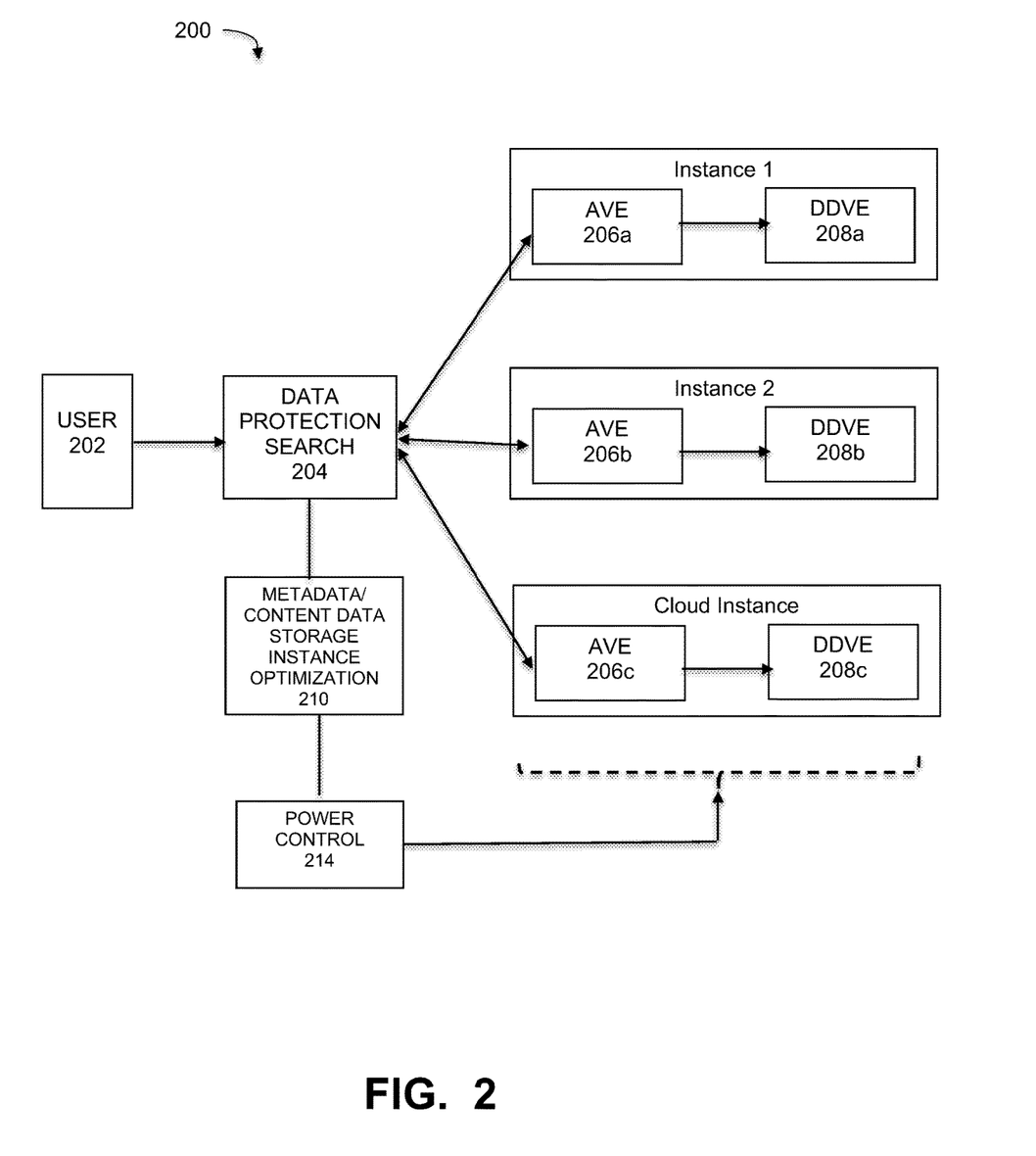
FIG. 2 illustrates a data protection storage system having different metadata and content data storage instances, under some embodiments.

FIG. 2 illustrates a data protection storage system having different metadata and content data storage instances, under some embodiments. For the embodiment of FIG. 2, the data storage system 200 comprises metadata stored in AVE storage, while the associated content data 206 is stored in DDVE storage 208. A user 202 may specify a first amount of storage for their system, which is provided in the form of an instance. As an example, DDVE storage may be on the order of 96 Terabytes, while AVE storage may be on the order of 4 to 16 Terabytes. As data requirements increase, more instances may be created. Thus, as illustrated in FIG. 2, three instances are provided for the user and are denoted Instance 1, Instance 2, and a Cloud Instance. Either or both of Instance 1 and 2 may be on-premise instances, or they may be cloud instances.

In general, the amount of actual storage capacity for each instance is pre-defined and specified by the user with respect to an agreement or subscription with a cloud provider or other system administrator. Once the storage capacity of an instance is fully consumed by either metadata (AVE) or content data (DDVE), a new instance may be created for that user. Thus, for the example embodiment of FIG. 2, system 200 includes a first instance (Instance 1) which has metadata storage AVE 206a and content storage DDVE 208a, a second instance (Instance 2) which has metadata storage AVE 206b and content storage DDVE 208b, and a third instance (Cloud Instance) which has metadata storage AVE 206c and content storage DDVE 208c. Any practical number of instances in addition to the first instance may be created and deployed depending on the system requirements and storage capacities.

In system 200, the content data is stored as data blocks in DDVE storage, while the AVE stores metadata comprising file names, handles, directory paths, and so on, for corresponding data blocks. The stored content data may be deduplicated by backup program 112, and the stored metadata may likewise be deduplicated. In this manner, a two-stage deduplication process may be provided. The content data (in DDVE) is accessed through a directory path and file identifier provided in the metadata (in AVE).

In an embodiment, the user 202 accesses the stored data through a data protection search program 204. The search program 204 utilizes indexes created for the metadata and/or the content data in the AVE and DDVE, respectively. This function may be provided to the user 202 though a familiar, web-based (e.g., Google-like) search interface. It supports filtering and visualization of file system metadata like file name, location, date, size, and so on. In an embodiment, the indexing mechanism for the metadata and content data may be implemented though an open source indexing program, the Common Indexing Service (CIS) or any other similar indexing service.

The search process 204 may interact with the AVE and DDVE storage device through scheduled interactions (e.g., data collection activities), on-demand interaction (e.g., user search activity), or background interaction (e.g., updating caches, garbage collection, and so on).

As data is stored by certain backup processes, such as backup program 112, certain stored data blocks may become expired. For example, data may be expired after a certain retention period and/or garbage collection processes of the deduplication backup software may cause data blocks to be marked for deletion. As data blocks are expired or deleted, older instances may be reduced to storing less than full capacity than later instances, which typically store newer data. In present cloud-based environments, such partially full or even empty or near empty instances may be idle, but still cost the user money by consuming operational energy that is passed on by the cloud service provider. Thus, in a typical practical implementation, running both AVE and DDVE within each instance can be expensive, and any additional instances that are deployed should be fully utilized to minimize unwanted costs.

In an embodiment, the search process implements or executes the data storage instance optimization process 210 by helping move data from non-full instances to more full instances to reduce the presence of empty instances to reduce the operational costs associated with inefficient use of cloud storage. The optimization process 210 can also control the system power 214 to power off or power on the AVE/DDVE instances as needed to thus tailor power on cycles to the usage of the metadata and data storage devices.

Figure 3:
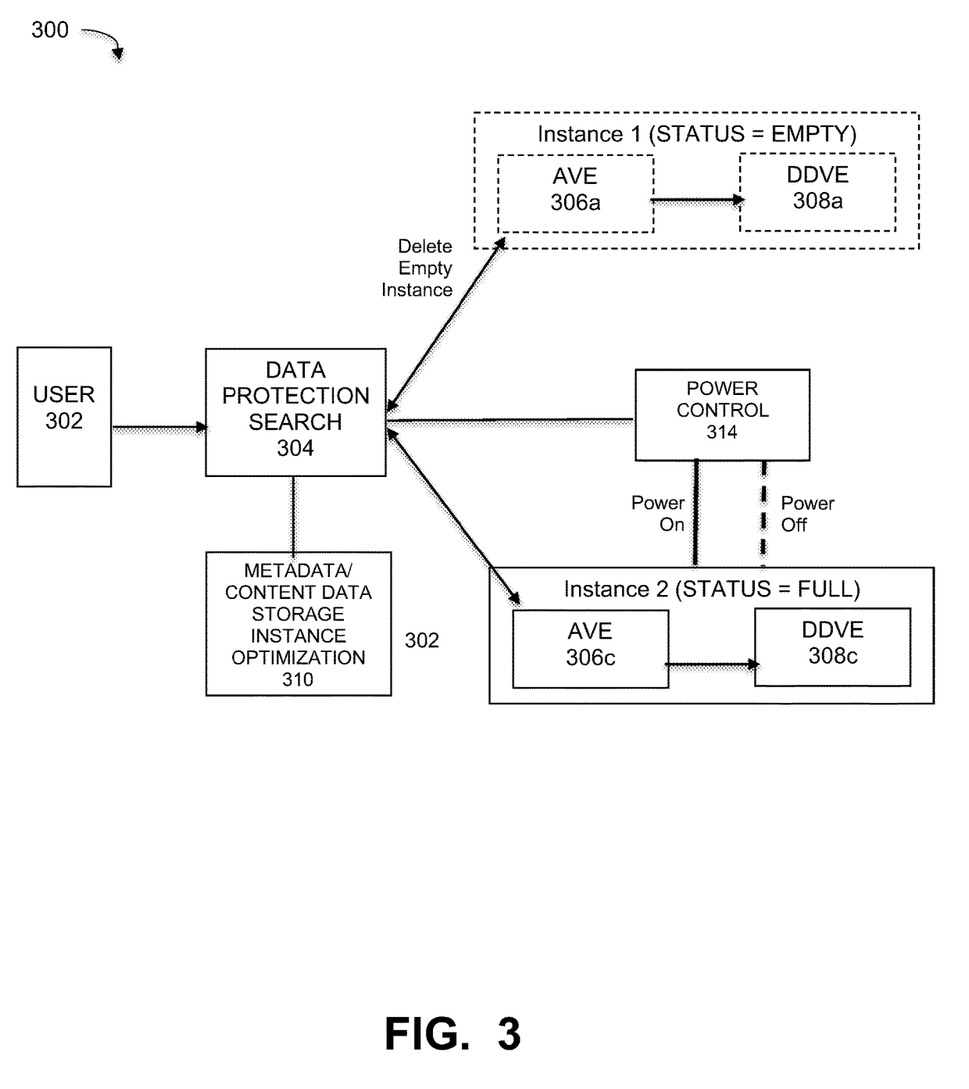
FIG. 3 illustrates operation of the data storage instance optimization process with respect to power control, under some embodiments.

FIG. 3 illustrates operation of the data storage instance optimization process with respect to power control, under some embodiments. In system 300 of FIG. 3, the data protection search process 304 as executed by user 302 is configured to monitor the status of the different instances, such as Instance 1 and Instance 2. The status parameters can include the amount of data stored in each instance from full to empty and any level in between. The status parameters also include the amount of activity for each instance based on whether and how often the data is accessed. For the example of FIG. 3, Instance 1 is empty because neither the AVE 306a nor DDVE 308a have any stored data. This may be because old data has been retired after a retention period, or the data has been flagged for deletion by a garbage collection process of the deduplication backup system. In this case, maintaining the empty instance would leave it idle, but still running the actual disk devices comprising the virtual storage. To save the power expense, such an empty instance would be deleted by the data storage instance optimization process 310.

In system 300, the optimization process 310 also controls the power to active full or partially full instances. When an instance is full, such as shown for Instance 2 in which either or both of AVE 306c and DDVE 308c are at full capacity with metadata or content data, respectively, the power to the drives of this instance can be controlled. In general, a full instance is not necessarily a frequently accessed instance, since new data would likely be written to and read from a new instance, at least a certain amount of time after it was filled. Older data tends to be archived data that is eventually subject to emptying through retention policies. While an instance if full, optimization process 310 monitors the amount of data access activity the instance undergoes. A full instance that is still active may be kept powered on, while an inactive full instance may be powered down to save power. When a search by a user impacts data in the full instance, that instance can then be powered back up by the power control unit 314 as controlled by the optimization process 310 of the DP search function 304. Alternatively, a full instance may not be monitored for operation, but rather powered down as soon as it becomes full, with the power control 314 enabling Power Off upon change of status to FULL. Any access to this full instance would then cause the power control to enable Power On to the storage devices of the instance.

Figure 4:
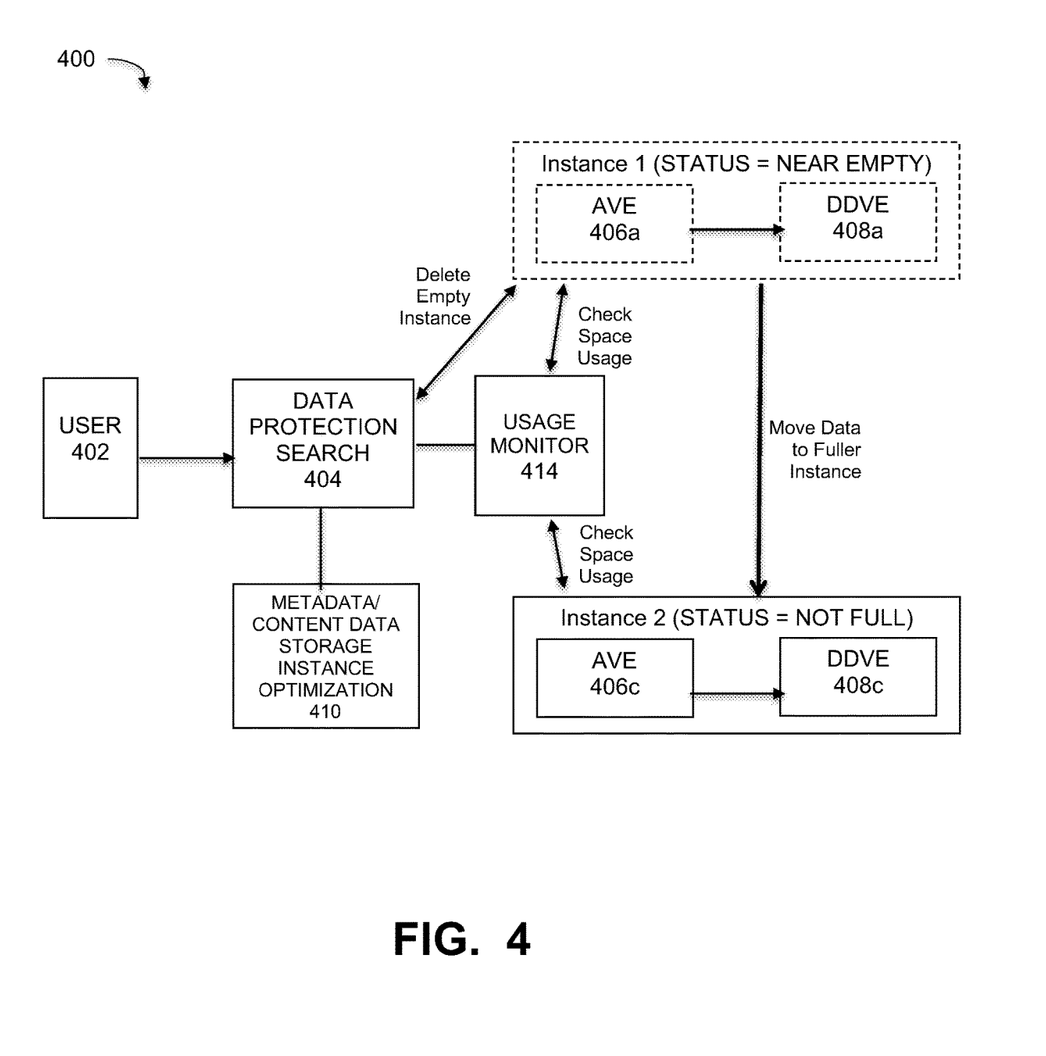
FIG. 4 illustrates operation of the data storage instance optimization process with respect to usage monitoring, under some embodiments.

FIG. 4 illustrates operation of the data storage instance optimization process with respect to usage monitoring, under some embodiments. In system 400 of FIG. 4, the data protection search process 404 as executed by user 402 is configured to monitor the status of the different instances, such as Instance 1 and Instance 2, through usage monitor 402. The status parameters primarily include the amount of data stored in each instance from full to empty and any level in between. For the example of FIG. 4, Instance 1 is nearly empty because both the AVE 406a and DDVE 408a have less than a defined amount of data. The amount of data within an instance may be characterized by any appropriate scale, such as FULL (e.g., 97-100% full), ¾ FULL (75%), HALF FULL (50%), ¼ FULL (25%), and EMPTY (0%). Other scales can also be used, such as percentage full in 10% increments, and so on. Instances that are near empty or not more than ½ FULL may be eligible to have their data moved to another more or equally full instance. In this manner, data that is spread among instances that are not all full can be consolidated to empty certain instances that can then be deleted by the data storage instance optimization process 410.

In system 400, the optimization process 410 controls a usage monitor 414 that monitors the relative data occupancy of each instance. When an instance is sufficiently empty, i.e., more empty than full, the optimization process 410 identifies other instances that are not full and may be able to accommodate the data stored in that instance. For the example of FIG. 4, Instance 1 is near empty, while Instance 2 is not full. If the AVE storage 406c and DDVE storage 408c of Instance 2 can accommodate the metadata in AVE 406a and the content data in DDVE 408a of Instance 1, this data will be moved from Instance 1 to Instance 2. This makes Instance 1 an EMPTY instance, which can then be deleted to save power.

FIG. 4 illustrates an example of emptying a storage instance by moving data from a non-full or near empty instance to a more full instance. Other data consolidation schemes can also be used, however. For example, if three instances each having about ⅓ of the total data, one instance can be selected to be the active instance to receive data from the other two instances, which can then be deleted. Likewise, a less full instance can take data from a more full instance, if certain operating benefits are realized, such as more activity, more power-efficient devices, better access speed, and so on.

Figure 5:
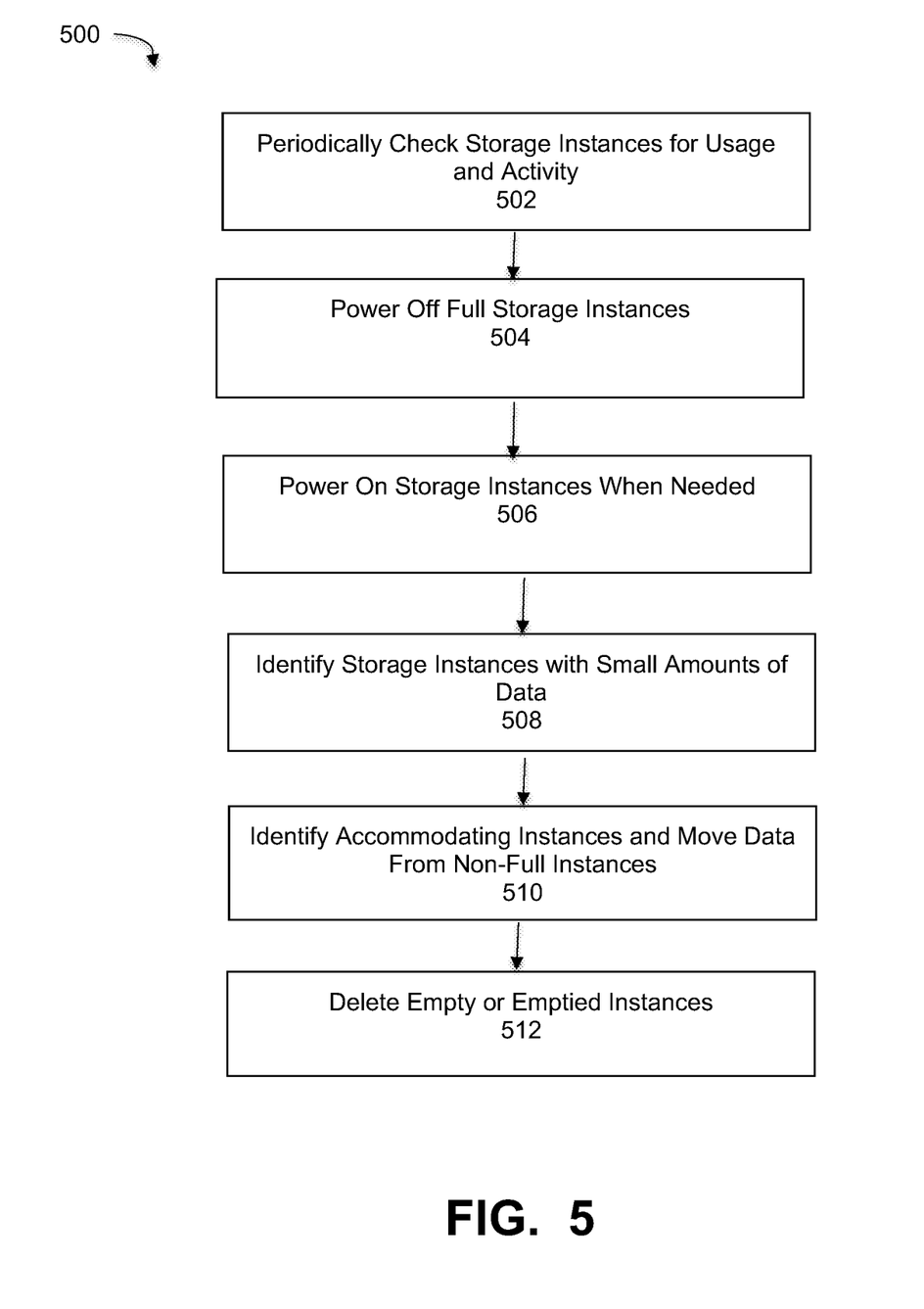
FIG. 5 is a flowchart that illustrates an overall process of optimizing data storage instances, under some embodiments.

Through the usage monitor 414 and power control 314 components, the data storage instance optimization process can consolidate data among non-full instances, power down full or relatively inactive instances, and delete empty instances. FIG. 5 is a flowchart that illustrates an overall process of optimizing data storage instances, under some embodiments. Process 500 of FIG. 5 starts with the search component or process 111 periodically checking the managed storage instances containing AVE and DDVE storage devices, 502. The periodic schedule can be set by a defined period, such as daily, weekly, and so on. In some embodiments, it may follow the garbage collection cycle, which is typically a daily or weekly process to free up storage media by deleting duplicate blocks identified by the deduplication backup program. Since the garbage collection process effectively frees up space in the data storage devices, the optimization process 120 can utilize this garbage collection optimization to consolidate data and delete empty storage instances.

Through the periodic check process, such as may be performed by a monitor function 414 of the search process, full storage instances can be identified, 504. Such full instances can be powered off, as no new data can be written to it. If any powered off instances are needed for use, such as through download/restore/delete file operations, or certain background tasks (e.g., garbage collection), they can then be powered back up, 506. This power up function can be embedded with the search processes other operations, such as restore, retention, and so on, and it is executed on-demand. Other processes of FIG. 5 however may be executed on a periodic basis.

The monitor function also identifies storage instances that have little or less than full amounts of data, 508, to determine whether data can be moved from less full instances to fuller instances, 510. The instances from which such data is moved are then empty and can be deleted, 512. In this way, energy is saved by consolidating data within fewer storage instances and full storage instances are powered off unless needed. This helps reduce operating costs in systems where data storage usage is metered and charged to the customer, such as in cloud computing environments.

System Implementation

Embodiments of the processes and techniques described above can be implemented on any appropriate backup system operating environment or file system, or network server system. Such embodiments may include other or alternative data structures or definitions as needed or appropriate.

Figure 6:
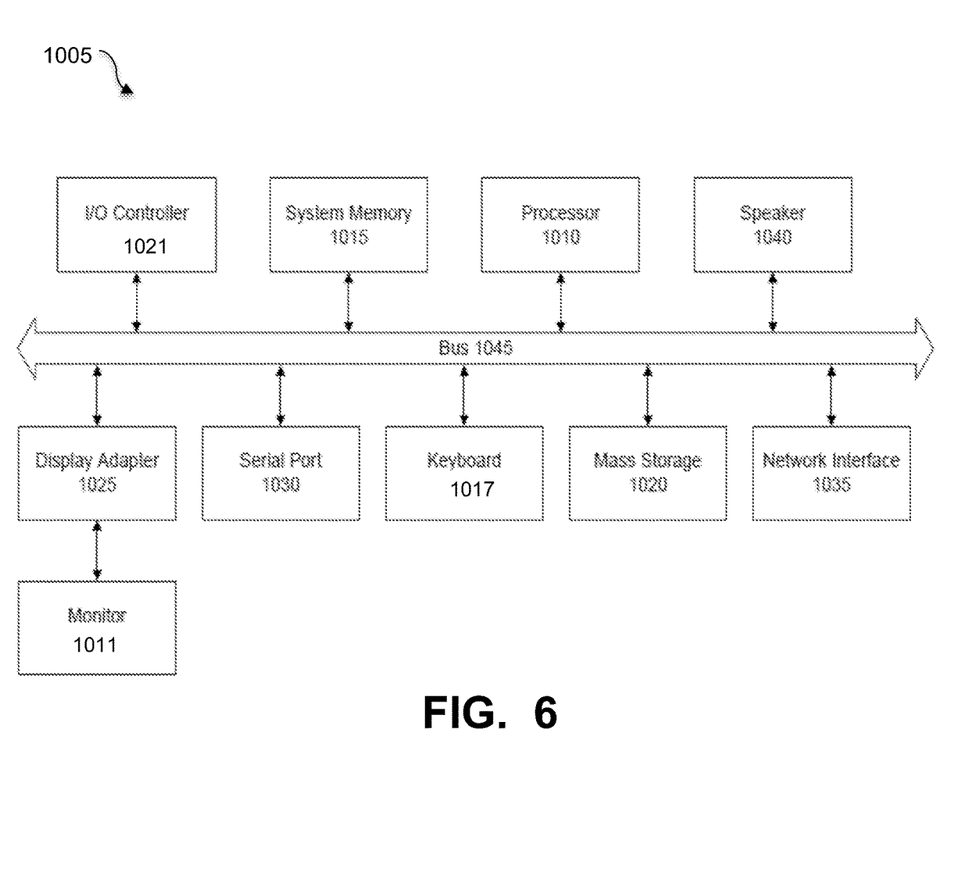
FIG. 6 is a system block diagram of a computer system used to execute one or more software components of the network tuning process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 6 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing data storage instances in a cloud-computing network, comprising:
    storing, in a first virtual datastore, metadata of data to be protected by an end-to-end data protection system;
    storing, in a second virtual datastore, content data corresponding to respective stored metadata;
    utilizing a data protection search function to access data based on metadata indexes and content data indexes for the stored metadata and stored content data;
    maintaining a plurality of different storage instances for the data access, wherein each instance has a respective associated cost and resource requirement;
    periodically checking, by a storage instance optimization process, the plurality of storage instances containing the metadata and content data, wherein the metadata is stored in on-premise storage and the content data is stored in cloud storage;
    scaling the storage instances by adding metadata storage and data storage in accordance with memory usage by the metadata and content data, wherein the cloud storage is charged to a subscribing user based on usage;
    identifying full storage instances of the plurality of storage instances;
    powering off disk drives of the identified full storage instances for use used by direct access operations or background backup operations;

powering on the powered off disk drives of the full storage instance upon usage of data stored on the powered off disk drives;
identifying non-full storage instances of the plurality of storage instances;
moving data from a non-full storage instance to a fuller storage instance with sufficient spare storage capacity to create an empty storage instance; and
deleting the empty storage instance.

2. The method of claim 1 wherein the end-to-end data protection system comprises backup server executing a deduplication backup system.

3. The method of claim 1 wherein the first virtual datastore and second virtual datastore are each implemented by one or more virtual machines in the network.

4. The method of claim 3 wherein the step of periodically checking is performed by a monitoring component, and wherein a defined period in on the order of daily or weekly checks.

5. The method of claim 4 wherein the defined period conforms to a garbage collection process of the deduplication backup system.

6. The method of claim 1 wherein the metadata stores attributes of the file selected from the group consisting of: file name and directory path to uniquely identify a file stored in an associated instance.

7. The method of claim 1 wherein the data protection search function provides an operating environment and user interface for the computer-implemented method.

8. The method of claim 1 wherein the plurality of storage instances comprises a large-capacity storage cluster accessed by the search function executing data access requests by a user through the user interface.

9. The method of claim 8 wherein the search function utilizes indexes created for the metadata and/or or the content data in their respective storage devices.

10. A system for optimizing data storage instances in a cloud-computing network, comprising:
a first virtual datastore storing metadata of data to be protected by an end-to-end data protection system;
a second virtual datastore storing content data corresponding to respective stored metadata;
a data protection search function accessing data based on metadata indexes and content data indexes for the stored metadata and stored content data;
a plurality of storage instances maintained for the data access, wherein each instance has a respective associated cost and resource requirement;
a monitor periodically checking the plurality of storage instances containing the metadata and content data storage devices, wherein the metadata is stored in on-premise storage and the content data is stored in cloud storage, the system scaling the storage instances by adding metadata storage and data storage in accordance with memory usage by the metadata and content data, wherein the cloud storage is charged to a subscribing user based on usage, and the monitor further identifying full storage instances of the plurality of storage instances, and non-full storage instances of the plurality of storage instances;
a power component powering off disk drives the identified full storage instances, and powering on the powered-off disk drives of the full storage instance when accessed for use used by direct access operations or background backup operations;
an interface moving data from a non-full storage instance to a fuller storage instance with sufficient spare storage capacity to create an empty storage instance; and
a storage instance optimization component deleting the empty storage instance.

11. The system of claim 10 wherein the end-to-end data protection system comprises backup server executing a deduplication backup system, and wherein the first virtual datastore and second virtual datastore are each implemented by one or more virtual machines in the network.

12. The system of claim 10 wherein the monitor periodically checks according to a defined period in on the order of daily or weekly checks.

13. The system of claim 12 wherein the defined period conforms to a garbage collection process of the deduplication backup system.

14. The system of claim 10 wherein the metadata stores attributes of the file selected from the group consisting of: file name and directory path to uniquely identify a file stored in an associated instance.

15. The system of claim 10 further wherein the data protection search component provides an operating environment and user interface optimization component.

16. The system of claim 10 wherein the plurality of storage instances comprises a large-capacity storage cluster accessed by the search function facilitating executing data access requests by a user through the user interface.

17. The system of claim 16 wherein the search component utilizes indexes created for the metadata and/or or the content data in their respective storage devices.

18. A computer program product, comprising a non-transitory computer-readable medium having a computer-readable program code embodied therein, the computer-readable program code adapted to be executed by one or more processors to
storing, in a first virtual datastore, metadata of data to be protected by an end-to-end data protection system;
storing, in a second virtual datastore, content data corresponding to respective stored metadata;
utilizing a data protection search function to access data based on metadata indexes and content data indexes for the stored metadata and stored content data;
maintaining a plurality of different storage instances for the data access, wherein each instance has a respective associated cost and resource requirement;
periodically checking, by a storage instance optimization process, the plurality of storage instances containing the metadata and content data, wherein the metadata is stored in on-premise storage and the content data is stored in cloud storage;
scaling the storage instances by adding metadata storage and data storage in accordance with memory usage by the metadata and content data, wherein the cloud storage is charged to a subscribing user based on usage;
identifying full storage instances of the plurality of storage instances;
powering off disk drives of the identified full storage instances for use used by direct access operations or background backup operations;
powering on the powered off disk drives of the full storage instance upon usage of data stored on the powered off disk drives;
identifying non-full storage instances of the plurality of storage instances;

moving data from a non-full storage instance to a fuller storage instance with sufficient spare storage capacity to create an empty storage instance; and deleting the empty storage instance.

* * * * *